Nov. 9, 1965     F. J. TALBOT ETAL     3,216,239
BOILING POINT DETERMINATION
Filed March 25, 1963
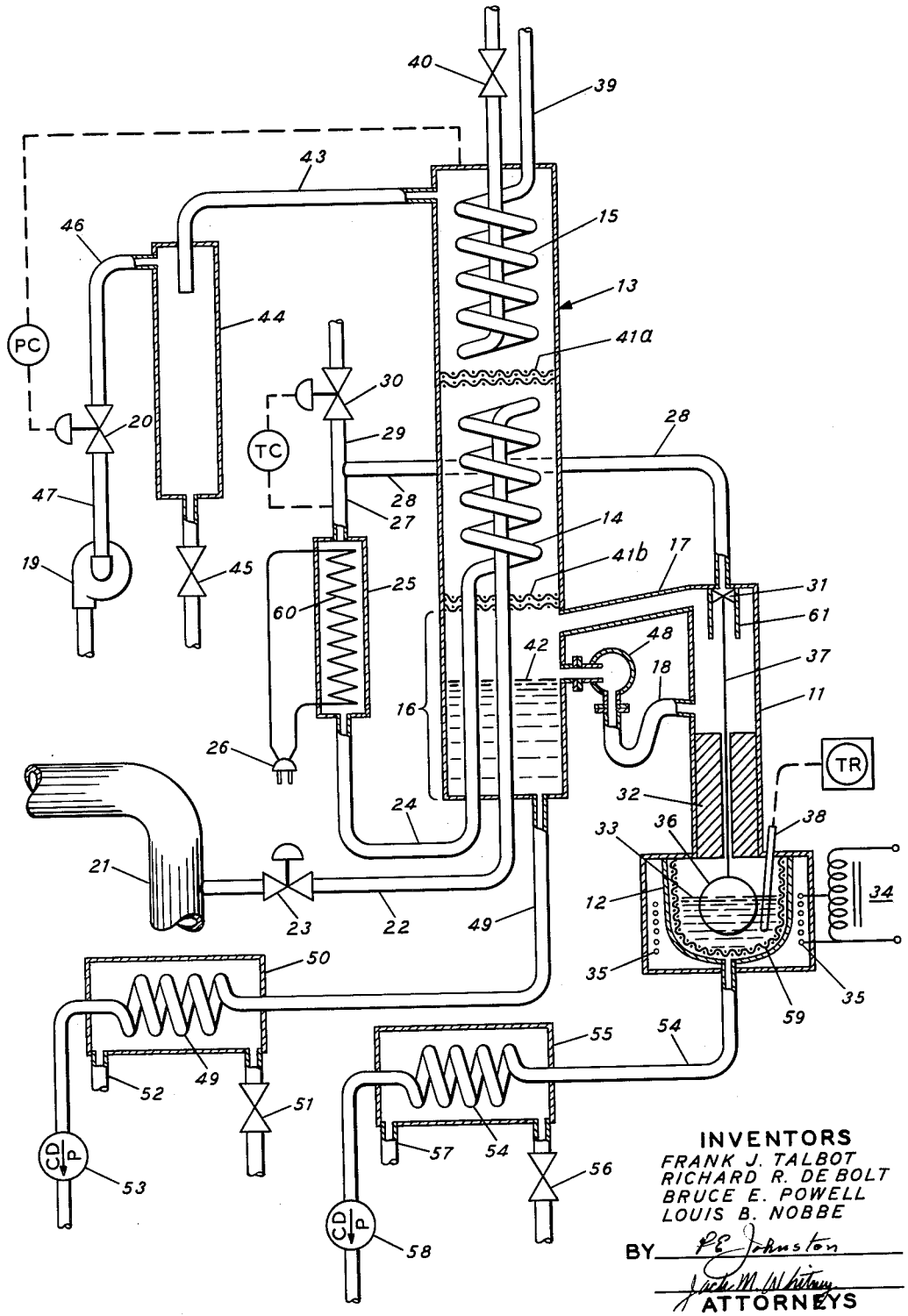
INVENTORS
FRANK J. TALBOT
RICHARD R. DE BOLT
BRUCE E. POWELL
LOUIS B. NOBBE
BY P.E. Johnston
Jack M. Whitney
ATTORNEYS 3,216,239
BOILING POINT DETERMINATION
Frank J. Talbot, Berkeley, Richard R. De Bolt, Richmond, Bruce E. Powell, Kensington, and Louis B. Nobbe, Oakland, Calif., assignors to California Research Corporation, San Francisco, Calif., a corporation of Delaware
Filed Mar. 25, 1963, Ser. No. 273,217
16 Claims. (Cl. 73—17)

This invention relates to methods and apparatus for continuously determining a point on the distillation curve of liquid material boiling over a temperature range. More particularly, the invention is concerned with detecting a change in the end boiling point of a continuous stream of hydrocarbon distillate in a process, such as petroleum distillation, wherein the end boiling point of the distillate is subject to change as a result of changed conditions in the process.

In many commercial operations it is desired to determine a point on the distillation curve to control the boiling range of a liquid stream therein, for example, to obtain a clearly defined end boiling point so as to exclude undesired heavy components from a product or intermediate stream. Rapid and accurate control of the boiling range permits operation close to the maximum allowable end point whereby maximum yields can be obtained. Such close control is not feasible if time-consuming laboratory distillation of a sample must be relied upon for control purposes, in which case a lower yield must be accepted to allow for fluctuations. Hence, it is desired to be able to determine more rapidly, and preferably to monitor continuously, the end boiling point or other critical point on the distillation curve. Devices designed to do this are known as continuous distillation analyzers, boiling point analyzers, or end point analyzers.

Continuous distillation analyzers previously used are of two general types. In a first type a sample is partially vaporized to a constant extent in a miniature distillation unt, the degree of vaporization being controlled by a proportioning device giving a constant ratio of withdrawal of unvaporized liquid and condensed vapors. The total sample flow rate varies depending on the boiling range of the sample, as the reboiler heat input is held constant and the pressure in the unit, maintained at a constant superatmospheric value, is the motive force for maintaining continuous flow out of the apparatus. The temperature of the unvaporized liquid is indicative of the boiling point at the particular degree of vaporization. In a second type a smaller liquid sample is caused to flow down a heated rod or stick, whereby it undergoes progressive partial vaporization. The sample flow rate is held constant, and the rate at which drops of unvaporized liquid leave the heater stick is maintained constant by varying the heat input. The temperature of liquid at the bottom of the heater stick is measured as indicating the particular boiling point at atmospheric pressure.

The known devices are limited to use for analyzing fairly low boiling liquids, for example, hydrocarbon oils having a maximum end point of below about 650° F. The high temperatures required to vaporize higher boiling oils lead to fouling and decomposition problems in the apparatus.

It is an object of this invention to provide methods and apparatus to determine continuously a point on the distillation curve of streams boiling over a substantial temperature range, i.e., a range of at least 50° F., such as gas oils derived from crude petroleum or fractions thereof, particularly to determine a point indicative of the end boiling point of streams having end points above 650° F. and especially streams having end points in the range between about 700° F. and about 1150° F.

Another object is to control the end boiling point where such oils are to be used as feed stocks to conversion processes such as catalytic hydrofining, catalytic cracking, catalytic hydrocracking, and the like. The end boiling point of the feed to such processes exerts a substantial influence on the operation thereof, affecting the ease of conversion, the nature of the products, and catalyst life. Also, the end boiling point is an important control variable since it is frequently indicative of the concentration of contaminating materials such as sulphur, nitrogen, and metal compounds, all of which tend to concentrate in the higher boiling portions of petroleum. Thus, for example, if the end boiling point of a gas oil feed to a catalytic cracking unit can be closely controlled, the distillation can be carried out so as to obtain the maximum yield of gas oil having an end boiling point just below the point at which contaminating amounts of metal compounds begin to appear in the distillate. Similarly, it has been found that maintaining constant the nitrogen content of a distillate feed to a hydrofining or hydrocracking process makes possible more stable operation at optimum conditions, thereby achieving maximum profitability. It has further been found that the nitrogen content can be held constant by holding constant the end boiling point of the distillate, but even temporary increases in end boiling point can severely deactivate an acidic hydrocracking catalyt, for example, because of the increased amount of nitrogen poisons contacting the catalyst. This occurs even if a hydrofining step for nitrogen removal is used, because such processes usually remove only a fixed percentage of the nitrogen and must be continually adjusted if the feed nitrogen content changes, or must be operated at more severe conditions than necessary, to accommodate such changes. Control of the boiling point, however, requires that it be determined and/or that changes be detected continuously. As mentioned, this has not heretofore been feasible in the case of high boiling oils.

The present invention provides methods and means for rapidly and accurately determining a temperature indicative of the end boiling point of such high boiling materials in a continuous manner. In contrast to the boiling point analyzers of the prior art, which are operable only at atmospheric or superatmospheric pressure, the boiling point analyzer of this invention is operable under vacuum, thereby lowering the boiling point of the material and permitting the determination of boiling points in the range above about 650° F. and up to about 1100° F. (corrected to atmospheric pressure). In accordance with a preferred embodiment of the invention, a sample is continuously withdrawn from the stream to be tested, adjusted to a substantially constant temperature, and passed downwardly through a contacting column to a pot for boiling liquid, countercurrent to rising vapors generated in the pot, at constant subatmospheric pressure. A substantially constant amount of unvaporized liquid bottoms is maintained in the pot. The vapors are condensed to obtain a pool of overhead condensate, and overhead condensate and unvaporized bottoms are withdrawn at constant rates. Heat is supplied to liquid in the pot at a substantially constant rate sufficient to generate excess overhead condensate, and the excess condensate is returned to the column, like a reflux stream. The temperature of the unvaporized bottoms in the pot is measured. This temperature can be correlated with or calibrated against the standard ASTM boiling point of the liquid stream at the particular percent overhead represented by the relative amounts of condensate and bottoms withdrawn. Where more than about 90% of the sample is withdrawn as overhead condensate, the temperature is suitable for control of the end boiling point of the stream. If desired, a correction can be built into the temperature sensing instrument so that it indicates the corrected boiling point directly. Also, a signal can be generated to operate a control mechanism in the process from which the sample was obtained, in a manner adapted to change an operating condition therein so as to automatically obtain or maintain a desired boiling point. For example, the steam flow to the reboiler of a distillation column may be adjusted, or the temperature set point on a control tray may be reset, in response to the signal. In some instances it may be easier or preferred for other reasons to adjust automatically conditions in the process to which the liquid is fed, in a manner adapted to compensate for the changed boiling point. Also, in another preferred embodiment of the invention, the analyzer is used as a "null balance" instrument to generate a signal indicative of the amount of a detected change in boiling point from a desired set point, which signal then is used manually or automatically to operate a control mechanism to change an operating condition in the process from which the sample was obtained in a manner adapted to change the boiling point in an amount and in a direction opposite to the detected change to thereby maintain the boiling point constant. In such a case it would not be necessary that the signal actually be translated into a temperature reading. Usually, however, at least a visual indication of the temperature difference from the desired temperature is provided, as by a pen recorder, as useful process information.

Among the advantages of the present invention are that the apparatus is simple, compact, rugged in construction, and can be installed safely in hazardous locations. The apparatus operates continuously and automatically, requiring little or no operator attention or manual adjustment once appropriate constant rates within a wide range of operability have been established for the stream to be analyzed. The boiling point is determined with greater precision than is obtained by the standard laboratory distillation, and the reading is obtained rapidly and continuously. Substantial fluctuations in the boiling range of the liquid stream can be accommodated, and both the rate and magnitude of the change in boiling point can be detected. This ability to adjust for changes while measuring them without upsetting the operation is an important feature of the invention. Although many schemes can be devised for determining a fixed boiling point of an invariant stream at stable conditions, the many problems caused by changes in composition and conditions have defeated previous attempts at boiling point analysis and control, particularly under vacuum, because of unstable and erratic behavior.

These and other advantages will be apparent from the following detailed description, taken in conjunction with the attached drawing which is a diagrammatic cross-sectional representation of a preferred arrangement of apparatus used in an embodiment of the invention.

Referring to the drawing, there is shown a chamber comprising a hollow steel cylinder or column 11 and a hollow steel cylinder or drum 13 connected by pipe 17, which is a conduit for vapor, and by pipe 18, which is a conduit for liquid. Column 11 contains vapor-liquid distributing and contacting means, shown as bed 32 of packing. Details of the packing support structure and liquid distributors are not shown, as a variety of suitable constructions are well known to designers of vapor-liquid contacting devices. At its lower end column 11 is open to the interior of steel pot 12, which acts as a still or reboiler. An inlet for liquid sample through throttle valve 31 is provided at the upper end of column 11. Liquid flows down through the packing into pot 12 where a substantially constant amount of unvaporized liquid bottoms 33 is maintained by means of level control float 36, which regulates the opening of valve 31 by means of connecting rod 37. In pot 12 heat is supplied at a constant rate by means of electrical heating coil 35, energized by transformer 34, connected to a supply of electrical current. Float 36 occupies a substantial portion (about 60%) of the volume in the interior of pot 12, so that a major portion of the liquid therein is closely adjacent to the heated pot wall. To aid ready boiling by small bubble nucleation and to prevent "bumping" the interior of pot 12 is lined with a wire screen, 59.

The interior of drum 13, is divided into upper, mid, and lower portions by demisting pads 41a and 41b. The lower portion forms a vessel, condensate receiver 16. The mid portion contains a first condenser 14, and the upper portion contains a second condenser 15. Condenser 14 is a coil of steel tubing through which can be passed a cooling medium, such as a sample of the liquid to be analyzed, entering through conduit 22 and leaving through conduit 24, when valve 23 is opened to permit flow from sample source 21, such as the pipe through which the main stream is flowing. Condenser 15 is a similar coil of steel tubing through which cooling water or similar cooling medium can be passed, entering through conduit 39 and leaving through valve 40. Condensate running off the surfaces of the condensers can collect in receiver 16 up to the level of overflow pipe 18, which, as shown, is provided with sight glass 48 and a U trap for preventing backflow of vapors. Drum 13 is positioned at a higher elevation than column 11 so that the liquid overflow of receiver 16 can flow by gravity to a point in the upper portion of column 11. Preferably drum 13 and column 11 are side-by-side, and vapor conduit 17 slopes slightly downward so that any condensate formed therein flows into receiver 16. Shroud 61 prevents entrainment of entering sample into the vapor conduit.

There is thus provided a chamber defining a flow path for vapor from pot 12 upwards through column 11 to the condensers and condensate receiver. Vacuum pump 19 is provided to maintain an essentially constant subatmospheric pressure in the chamber described, as regulated by control valve 20 in response to the detected pressure in drum 13 or other suitable point. To protect the vacuum pump, there is provided a passageway for the uncondensed vapors from drum 13 through conduit 43 to surge pot 44, a hollow steel drum equipped with drain valve 45 for removing any collected liquid, then through conduit 46, valve 20, and conduit 47 to the vacuum device. Drum 44 performs another important function by acting as a "vacuum reservoir" to dampen out the effect of sudden changes in sample boiling range and permit close control of the pressure.

To maintain substantially constant the temperature of the liquid sample to be introduced to column 11, conduit 24 passes through constant heat input preheater 25 containing electrical heating coil 60, energized by connecting plug 26 to a source of electrical current. The preheated liquid sample can then pass through conduits 27 and 28 to valve 31. As means for controlling the sample temperature there is provided branch conduit 29 and outlet valve 30, the opening and closure of which is regulated automatically in response to the detected temperature of the preheated liquid, i.e., opening more when the temperature is too high. The unused portion of sample passing through valve 30 can be returned to the process from which it was derived or otherwise disposed of.

Pumps 53 and 58, preferably precision gear-driven positive displacement metering pumps, are provided for withdrawing condensate from receiver 16 through conduit 49, and for withdrawing unvaporized bottoms from pot 12 through conduit 54, at essentially constant rates. Coolers 50 and 55, preferably double-pipe heat exchangers into which low pressure steam can be passed through valves 51 and 56, insure positive action of the pumps without plugging or vaporization by cooling the respective liquids below their bubble points, but keeping them in a fluid state, particularly the bottoms which may be extremely viscous. Preferably, the condensed steam exhausts to the atmosphere through lines 52 and 57 to give a constant pressure and temperature in the steam jackets, thereby maintaining constant the temperatures of the overhead and bottoms streams at the inlets to pumps 53 and 58. Without some such temperature control it would be necessary in many cases to make corrections for density changes of the liquid streams or to use more complicated means for withdrawing at constant mass rates. The condensate and bottoms can be conveyed away separately, as shown, or combined and sent to a sump (not shown), or returned to the process or other disposal site.

As means for detecting the temperature of unvaporized bottoms in pot 12 there is provided thermowell site 38 into which a suitable temperature sensing instrument such as a thermometer, thermocouple, or the like may be inserted. A vapor-filled bulb giving a pneumatic signal translatable into a temperature reading has been used quite successfully in the embodiment illustrated. Preferably a recording instrument, TR, is connected to the temperature sensing device to provide a continuous record of the measured boiling point and/or changes therein, though readings at intervals of up to ten minutes are usually sufficiently frequent to detect changes in the boiling point.

It will be understood that the statement that means are provided for maintaining certain variables constant during operation does not exclude the occurrence of minor variations, as conventional control devices require some change to occur to set in motion compensating forces. Also, the closeness of the control depends on the accuracy desired. In the invention, however, for any desired accuracy certain factors are generally more critical and are more closely controlled than certain other factors. Thus, the amount of liquid in pot 12 and the rate of heat input to pot 12 are preferably maintained substantially constant, by which is meant that these variables are desirably constant, but may vary by as much as plus or minus 10%. This permits use of a simple transformer at 34, for example, without complicated regulators to compensate for fluctuations in the supply voltage. On the other hand, the temperature of the liquid sample to be introduced, the subatmospheric pressure, the rate of withdrawing condensate, and the rate of withdrawing bottoms are preferably maintained essentially constant, by which is meant that they are desirably constant but may vary plus or minus 1%, though not by much more than plus or minus 2%, in any event not by as much as 5%. To elaborate further, the temperature of the liquid sample to be introduced should not vary over 10° F. and is preferably controlled within 5° F. The pressure should be controlled within 2%, with even greater accuracy when below about 20 mm. Hg absolute. The relative rates of withdrawing overhead condensate and unvaporized bottoms should be such as to control the percent overhead within 1%, or even closer when taking about 95% overhead, as the boiling point of a heavy gas oil is often 20° F. higher at the 96% point than at the 94% point and it is desirable to control the 95% point within 5° F. of a set temperature. Control of the percent overhead within 1% is possible, however, even if the absolute rate of withdrawing one of the streams varies by 5%.

A demonstration unit suitable for commercial use, constructed substantially as shown in the drawing, uses a column 21 inches tall, having an inside diameter of 4 inches containing one foot of ¼ inch Penn State extruded metal packing, mounted above a pot having a free volume around the float of about one quart. The heater for the pot has a rating of 4000 watts, and the heater for the electrical sample preheater has a rating of 2500 watts. The drum containing the condensers and receiver is about 6 inches inside diameter by 30 inches, and the surge pot has a volume of about one cubic foot. The entire apparatus, including everything shown in the drawing (except the sample source) as well as associated equipment not shown, including conventional controllers, transmitters, switches, wiring, a pressure regulator at valve 23, a line filter for the sample, and automatic shutdown safety devices, is mounted within a steel frame about 3 feet square and 6 feet tall with ample access to all components.

Usually, the unit is placed as close as possible to the sample source, and the temperature recorder is placed in the control house, which may be a considerable distance away.

The use of the invention as embodied in the demonstration unit in determining the end boiling point of a gas oil side-cut distillate, boiling from about 600° F. to about 900° F., obtained in the fractionation of crude petroleum, will now be described by way of example. A sample of the side-cut flowing from the crude distillation column is obtained from line 21 through sample valve 23 at a temperature of about 200° F. and a pressure of about 50 p.s.i.g. The sample passes through line 22 into preheater-condenser 14 in drum 13 where it is warmed to about 260° F., and leaves through line 24, then passing through electrically heated sample preheater 25 where the temperature is raised to about 460° F. The sample flow rate through this portion of the sample conduit is about 8 gallons per hour, of which about 4 gallons per hour are withdrawn for temperature control via line 29 through valve 30 and returned to the crude still. The remaining portion passes through line 28 and valve 31 into the top of packed column 11, where the pressure is 40 mm. of mercury absolute. A portion, about 20%, of the sample flashes to vapor at these conditions, and the remaining liquid trickles down through the packing, exchanging heat with upflowing vapors generated in pot 12 below the column, thereby vaporizing further portions of the liquid. The unvaporized material collects in pot 12 as a pool of boiling liquid. From the bottom of pot 12 unvaporized bottoms is withdrawn by gear pump 58 through line 54 at a fixed constant rate of 0.30 gallon per hour.

The heat input through coil 35 by transformer 34 is 1600 watts, sufficient to vaporize all of the hot sample entering the unit. The vapors rise from the pot through the vapor flow path defined by column 11, vapor line 17, preheater-condenser 14, and condenser 15. The highest boiling portions of the vapors are condensed on the surfaces of coil 14 at a relatively warm temperature. The uncondensed, relatively lower-boiling, vapors are then substantially totally condensed by contact with the cold heat transfer surface of heat exchanger 15 through which water is flowing. The double condenser arrangement prevents high boiling or waxy materials from solidifying out, as might occur if the vapors were passed directly to the cold heat transfer surface 15. The condensate collects as pool 42 in the lower portion of drum 13, which is the condensate receiver 16. Demisting pad 41b prevents cold condensate from falling directly from pad 41a into the pool of hotter liquid. From the bottom of the receiver the net overhead condensate is withdrawn by pump 53 at a set constant rate of 3.6 gallons per hour through line 49. Since the heat input to pot 12 is more than sufficient to generate this amount of overhead, the liquid level in receiver 16 builds up to the level of outlet line 18. The excess flows by gravity through reflux line 18 to column 11, as can be observed in sight glass 48. A constant pressure of 40 mm. of mercury obsolute is maintained in the chamber of the apparatus, measured at the top of drum 13, by vacuum pump 19 and control valve 20. Since the initial boiling point of the sample is about 600° F., an inconsequential amount of material is removed through the vacuum pump. The vacuum device works mainly on the small amount of very low-boiling components dissolved in the distillate feed. The temperature detected by instrument 38 in pot 12 is 628° F. The 93% point of the sample, corrected to atmospheric pressure, is 850° F.

When as a result of changed conditions in the crude distillation the gas oil becomes slightly lower boiling, a slightly greater portion of the sample is vaporized at the inlet and by heat transfer from the upflowing vapors. Less material thus tends to reach pot 12, which would tend to cause float 36 to drop thereby opening valve 31 slightly more. Since the bottoms and overhead withdrawal rates remain constant, a somewhat greater amount of condensate tends to collect in receiver 16, but is immediately returned to column 1 through line 18. This results in more liquid reaching pot 12, tending to restore the original level and return valve 31 to its original position. The material reaching pot 12, however, is lower boiling, thereby resulting in a lower temperature reading by instrument 38. The apparatus thus has correctly detected the lower boiling point of the sample. Similarly, when the boiling point of the sample increases, the level in pot 12 tends to rise pinching off valve 31 slightly until the decreased amount of reflux in line 18 again stabilizes the conditions to give a higher temperature reading at 38 indicative of the higher boiling point.

The automatic reflux return feature thus lends stability to the operation, making it self-regulating and capable of accommodating and adjusting to large variations in boiling point with such rapidity that the level in pot 12 and the sample input rate do not "hunt" a set point, but remain quite constant. The main function of the level control in pot 12 is to achieve automatically an initial sample input rate equal to the combined constant withdrawal rates of condensate and bottoms, and thereafter to maintain that inlet rate. Thus, at startup everything is turned on except the pumps, and total reflux operation is used to heat up the apparatus. When the pumps are started up, the apparatus quickly reaches an equilibrium condition automatically, and continues to operate unattended. In combination, the level control and condensate return also compensate for the permitted variations in sample preheat temperature and heat input to the still or pot.

The combination of constant material balance maintained by pumps 53 and 58 with constant heat balance maintained by constant input heater 35 and by constant preheat temperature of sample in line 28, coupled with the automatic self-regulating feature of overflow reflux from receiver 16 to column 11, results in the temperature measured in pot 12 being truly indicative of the boiling point temperature of the sample at a fixed percent evaporation point on its distillation curve, i.e., the graph of temperature vs. percent overhead at constant pressure. If the heat input or sample temperature are permitted to vary substantially variations in the temperature in pot 12 are not necessarily indicative of changed properties of the sample in terms of its boiling point. Hence, all of the apparatus should be well insulated. In a preferred embodiment the entire column and pot assembly is enclosed in a metal box, and the void space filled with a removable friable insulation such as vermiculite.

Preferably the temperature of the preheated sample to be introduced is near its bubble point so that the heat input to the pot is minimized, but low enough so that excessive flashing does not occur at valve 31, as this complicates the control problem. Up to about 50% vaporization at the inlet has been permitted with no difficulty arising in test runs. The sample inlet point should be sufficiently remote from the pot wherein the boiling point is measured so that some rectification by heat and mass transfer occurs before the liquid reaches the pot if a boiling point above the 80% point is to be measured accurately.

In some cases the sample will be available at a sufficiently high temperature such that it is neither necessary nor desirable to pass it through preheater-condenser 14. In that case it is preferable to pass some other warm heat transfer medium through the coil to effect the preliminary condensation of the higher boiling portions of the vapor. Also, if the apparatus can be mounted closely adjacent a sample source maintained at a constant temperature, further preheating and temperature control may be dispensed with. Usually, however, ten or more feet of sample pipe separates the apparatus from the stream sampled causing variable heat losses, and the source temperature is either unreliable or lower than desired. Since the sample inlet temperature may be controlled at any point in a wide operable range, gradual temperature changes within the range would not be expected to affect the performance or accuracy significantly. Too rapid changes in inlet temperature cause erratic and unstable operation. Control is necessary primarily to prevent sudden changes of over 5° F. and to prevent drift outside the operable range.

From the foregoing it is apparent that the invention can be used to determine nearly any desired point on the distillation curve of a liquid by appropriately setting the rates of withdrawing condensate and bottoms. The invention is particularly concerned with measuring temperatures at or above the mid boiling point, however, and a special feature is the ability to determine boiling points in the region of the 95% overhead point, as indicative of the end boiling point, of hydrocarbon liquids having 95% points in the range of 700° F. to 1100° F., which liquids would degrade or decompose if actually subjected to such temperatures. The boiling point of the liquid is lowered to a temperature at which decomposition does not occur, generally to 200–650° F. in the case of petroleum distillates, by independently controlling the pressure at an appropriate subatmospheric level, generally between 5 and 700 mm. Hg absolute. The column will have an appropriately larger diameter when the instrument is to be used with a class of feed samples requiring pressures as low as 5–20 mm. as compared to when the pressure is 20–100 mm., for example, to reduce the pressure drop to 10% or less, depending on the accuracy desired. Operation at superatmospheric pressure is also possible where desired, as with low boiling samples.

To determine a point between the 80% and 97% overhead points on the distillation curve the rate of withdrawing overhead condensate is between 4 and 30 times the rate of withdrawing unvaporized bottoms. To determine a point indicative of the end boiling point the overhead condensate rate should be at least 8 times the bottoms rate, preferably to determine at least the 90% point. Actual measurement of the end boiling point implies distilling to dryness, which is not done in the invention. True end point measurements are subject to such great inaccuracy due to the large effect of minute amounts of high boiling impurities and the difficulty of ascertaining the exact point of dryness as to be of little value. The end point determined by correlation from the 95% boiling point determined in accordance with the invention has been found to be a more meaningful measurement and more reliable and reproducible.

The following series of examples using the demonstration unit previously described show how various factors affect its accuracy, speed of response, and range of operability, and generally illustrate the use of the invention. In these examples the sample source was a five gallon can containing the sample oil, and a pump was used to pass the oil through the preheaters. The portion of sample which was withdrawn for temperature control after passing through the preheater, and hence not introduced into the column, was returned directly to the 5-gallon can. The bottoms and overhead streams were also pumped back into the can, giving a continuous circuit, for constant feed composition. As described hereinafter, in some instances the feed composition was varied by separately collecting the bottoms whereby the feed became gradually lower boiling. In other instances the separately collected bottoms was added all at once to the feed can whereby the feed became immediately higher boiling. Other alterations in operation are also described.

*Example 1.—Effect of feed temperature*

The feed to the analyzer was a sample of a vacuum top cut from the distillation of reduced crude petroleum. The sample was introduced at the rate of about 4 gallons per hour to the analyzer, wherein the pressure was maintained at 40 mm. Hg absolute, and condensate and liquid bottoms were withdrawn at constant rates giving a 93% overhead split. At a constant heat input to the pot for boiling liquid the maximum and minimum feed inlet temperatures were found to be about 475° F. and about 415° F. The 93% temperature measured in the pot was 628° F. at all feed temperatures in this range when the feed temperature changed only slowly. Rapid temperature changes of over 10° F. caused unstable operation.

*Example 2.—Effect of heat input*

With the same feed, feed rate, pressure, and split as in Example 1 the feed temperature was held constant, and the heat input to the pot was varied by setting at different constant rates. The maximum and minimum heat inputs were found to be about 1640 watts and 1330 watts. At higher heat inputs flooding occurred, i.e., the upflowing vapor prevented liquid flow down through the packing, observable in extreme cases by liquid backing up in the sight glass in the condensate return line. At lower heat inputs there was no reflux. The temperature measured in the pot was essentially the same, within 2° F., at all conditions within the operable range.

*Example 3.—Effect of pressure*

With the same feed, feed rate, and overhead split as in the preceding examples, the pressure was lowered to 20 mm. Hg absolute. The operable feed temperature range at constant heat input was narrower, and the maximum and minimum heat inputs at constant feed temperature were closer together, indicating that operation would be unstable if the supply voltage to the pot heater varied substantially. The operable range is broadened by using a lower feed rate, i.e., by proportionately decreasing the rates of withdrawing condensate and bottoms.

*Example 4.—Response to gradual change in boiling point*

At 40 mm. Hg pressure and 93% overhead split the bottoms from the analyzer was separately collected while the overhead condensate was continuously recycled to the analyzer feed, thereby causing the temperature measured in the boiling liquid to drop gradually from 660° F. to 649° F. The feed was a higher boiling lube distillate. The apparatus showed accurately the rate and magnitude of the change with no adjustment in operation being made. ASTM D-1160 distillation, corrected to 40 mm. Hg absolute pressure, of samples of the feed at the beginning and end of the run also indicated a drop of 11° F. in the 93% point.

*Example 5.—Effect of step change in boiling point*

The entire amount of bottoms collected during the run described in Example 4 was suddenly added to the feed, thereby restoring the 93% point to its initial value. The measured temperature responded to the change, rising rapidly to the previous higher reading at a rate indicating a time constant of about 10 minutes for the unit at these conditions, with no upset and no adjustment in operation. In another run a step change of 60° F. in the boiling point was detected without upset. In commercial processes changes in boiling point are rarely this abrupt.

The accuracy of the measured boiling point can only be stated by comparing with the temperature determined by some other method, itself subject to inaccuracy, such as ASTM distillation. When determined under vacuum, the temperatures would have to be corrected to some standard conditions, by factors based on known physical properties and parameters determined experimentally, to be comparable. The temperature determined in accordance with the invention will not generally be the same as the temperature by ASTM distillation even at the same pressure because, for one reason, the temperature of the liquid is measured in the invention whereas the temperature of the vapor is measured in the ASTM method. Although a correlation can be developed, such is rarely required or desired, as the primary interest is in detecting temperature changes, and minimizing them, rather than in determining what the temperature is. Thus, speed and precision or reproducibility are the primary considerations, in both of which respects the invention has been found to be superior to laboratory distillation. The best point on the distillation curve for the control desired in combination with the best constant settings of sample temperature, flow rate, pressure, and heat input, for the optimum combination of precision, broad operable range, and short response time, can be readily determined by trial with the particular liquid stream to be analyzed.

Although only specific arrangements, constructions, and operations have been described in detail herein, numerous changes and modifications could be made therein without departing from the spirit of the invention, and such changes and modifications as fall within the scope of the appended claims are intended to be embraced thereby.

We claim:

1. Apparatus operable for determining at subatmospheric pressure a point on the distillation curve of a liquid boiling over a substantial range comprising in combination, a chamber adapted to be evacuated and defining a flow path for vapor, said chamber including a pot for boiling liquid, a column comprising vapor-liquid contacting means in the path of vapors rising from said pot, condensing means in the path of vapors from said contacting means, and a receiver adapted to collect as a pool condensate delivered by said condensing means, control means for maintaining constant pressure in said chamber, means for continuously introducing a sample of said liquid comprising an inlet at a point in said column, means responsive to the amount of liquid in said pot for regulating the rate of introducing sample, means for supplying heat to liquid in said pot at a constant rate, means operative independent of the rate of introducing sample for withdrawing liquid from said pot and condensate from said receiver at constant rates, means for passing overflow condensate from said receiver to said column, and means for detecting the temperature of liquid in said pot.

2. Apparatus as in claim 1 wherein said control means for maintaining a constant pressure comprises means for maintaining an essentially constant subatmospheric pressure.

3. Apparatus as in claim 1 in combination with means for maintaining essentially constant the temperature of sample to be introduced.

4. Apparatus as in claim 1 wherein said means for withdrawing liquid from said pot and condensate from said receiver comprises positive-displacement pump means for withdrawing liquid from said pot at essentially a constant rate, and separate positive-displacement pump means for withdrawing condensate from said receiver at essentially a constant rate.

5. Apparatus for detecting a change in the end boiling point of a liquid hydrocarbon stream boiling over a substantial range and above 650° F. comprising in combination a chamber defining a flow path for vapor, said chamber including a pot for boiling liquid, a contacting column in the path of vapors rising from said pot, condensing means in the path of vapors from said contacting means, and a receiver adapted to collect as a pool condensate delivered by said condensing means, means for maintaining an essentially constant subatmospheric pressure in said chamber, an inlet for continuously introducing a sample portion of said liquid stream at a point in said column remote from said pot, means for maintaining essentially constant the temperature of said sample portion at said inlet, heating means for supplying heat to liquid in said pot at a substantially constant rate, control means responsive to the amount of liquid in said pot for regulating the rate of introducing said sample portion, means for withdrawing liquid from said pot at essentially a constant rate, means for withdrawing condensate from said receiver at essentially a constant rate at least eight times the rate of withdrawing liquid from said pot, a connecting conduit adapted to pass overflow condensate from said receiver to said column, and means for detecting the occurrence of a change in the temperature of liquid in said pot as an indication of a change in the end boiling point of said liquid hydrocarbon stream.

6. Apparatus as in claim 5 wherein said means for detecting the occurrence of a change in the temperature of liquid in said pot comprises means for substantially continuously detecting said temperature and means recording a temperature indicative of the end boiling point of said liquid hydrocarbon stream based on the detected temperature.

7. Apparatus as in claim 5 wherein said means for maintaining essentially constant the temperature of said sample portion comprises a sample preheater of constant heat input and means for altering the flow rate of sample through said preheater.

8. Apparatus as in claim 5 wherein said condenser comprises a first heat exchanger for condensing vapors from said column by indirect heat transfer to a relatively warm medium and a second heat exchanger for condensing vapors not condensed by said first heat exchanger by indirect heat transfer to a relatively colder medium.

9. Apparatus as in claim 8 wherein said first heat exchanger comprises a preheater for said liquid sample.

10. Apparatus as in claim 5 so arranged and constructed as to permit flow of overflow condensate by gravity from said receiver to said column through said connecting conduit and to prevent backflow of vapor from said column through said conduit.

11. The method of determining a point on the distillation curve of a liquid hydrocarbon stream boiling over a substantial range and above 650° F. comprising the steps of continuously withdrawing a sample of said stream, maintaining the sample temperature essentially constant, passing at least a portion of said sample downwardly through a contacting column to a pot for boiling liquid countercurrent to rising vapors generated in said pot at essentially constant subatmospheric pressure, maintaining a substantially constant amount of liquid bottoms in said pot, condensing said vapors to obtain a pool of overhead condensate, withdrawing overhead condensate and liquid bottoms at essentially constant rates, supplying heat to liquid in said pot at a substantially constant rate sufficient to generate excess overhead condensate, passing the excess condensate to said column, and determining the temperature of unvaporized bottoms in said pot.

12. The method of detecting a change in the end boiling point of a liquid hydrocarbon stream boiling over a substantial range and above 650° F. in a process in which the end boiling point of said stream changes as a function of conditions in said process, which method comprises substantially continuously passing a sample of said stream at essentially constant temperature into and downward through a contacting column maintained at an essentially constant subatmospheric pressure to a pot countercurrent to vapors flowing upward from said pot, supplying heat at a substantially constant rate to liquid in said pot to obtain overhead vapors and unvaporized bottoms, maintaining a pool of unvaporized bottoms of substantially constant volume in said pot, condensing said vapors and collecting a pool of overhead condensate, returning a portion of said condensate to said column as reflux, the rate of supplying heat in said pot being sufficient to generate excess overhead for reflux, withdrawing unvaporized bottoms at an essentially constant rate, withdrawing overhead condensate at an essentially constant rate at least 8 times the rate of withdrawing unvaporized bottoms, and determining the temperature in said pool of unvaporized bottoms sufficiently frequently to detect a change therein indicative of a change in the end boiling point of said hydrocarbon stream.

13. The method of claim 12 wherein the difference between the temperature in said pool of unvaporized bottoms and a desired temperature is determined substantially continuously to generate a signal indicative of said difference which signal is used to operate a control mechanism in said process.

14. The method of improving a hydrocarbon conversion process employing a hydrocarbon feed prepared continuously in another process and passed continuously to said hydrocarbon conversion process, said feed having an end boiling point above 700° F., which comprises minimizing changes in the end boiling point of said feed by continuously passing a sample of said feed to a distillation analyzer operated under vacuum and therein determining a temperature indicative of the end boiling point of said feed by partially vaporizing said sample to an extent of from 90% to 97%, controlled by withdrawing condensed vapors and unvaporized liquid from said analyzer at constant rates, and measuring the temperature of said unvaporized liquid, and adjusting a control mechanism in the process for preparing said feed in response to the measured temperature in a manner adapted to maintain said temperature substantially constant.

15. The method of claim 14 wherein said hydrocarbon conversion process comprises catalytic cracking, said hydrocarbon feed is a gas oil prepared by distilling a heavier oil containing metal compounds, and said temperature is maintained substantially constant to control the end boiling point of said gas oil just below the temperature at which contaminating amount of metal compounds appear therein.

16. The method of claim 14 wherein said hydrocarbon feed is a nitrogen-containing oil prepared by distilling a heavier oil containing nitrogen compounds which tend to concentrate in the higher boiling portions of petroleum, said hydrocarbon conversion process comprises catalytic hydrocracking preceded by a hydrofining step which removes a fixed percentage of the nitrogen compounds in said feed, and said temperature is maintained substantially constant to maintain substantially constant the amount of nitrogen contaminants in said feed.

References Cited by the Examiner

UNITED STATES PATENTS

| | | | |
|---|---|---|---|
| 2,571,470 | 10/51 | Milligan | 73—53 |
| 2,639,609 | 5/53 | Shands | 73—17 |
| 2,709,678 | 5/55 | Berger | 202—160 |
| 3,081,619 | 3/63 | Pappas | 73—17 |
| 3,119,250 | 1/64 | Donnell | 73—17 |
| 3,120,119 | 2/64 | Luther | 73—17 |

FOREIGN PATENTS 892,407   3/62   Great Britain.

RICHARD C. QUEISSER, *Primary Examiner.*

JOSEPH P. STRIZAK, *Examiner.*